United States Patent
Baker

(10) Patent No.: US 7,159,016 B2
(45) Date of Patent: Jan. 2, 2007

(54) METHOD AND APPARATUS FOR CONFIGURING AN ENDPOINT DEVICE TO A COMPUTER NETWORK

(75) Inventor: Al Baker, Monmouth, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 795 days.

(21) Appl. No.: 10/023,611

(22) Filed: Dec. 18, 2001

(65) Prior Publication Data
US 2003/0115298 A1 Jun. 19, 2003

(51) Int. Cl.
G06F 15/177 (2006.01)
(52) U.S. Cl. .................... 709/220; 709/221
(58) Field of Classification Search .......... 709/220
See application file for complete search history.

(56) References Cited

U.S. PATENT DOCUMENTS

| | | | |
|---|---|---|---|
| 5,872,928 A * | 2/1999 | Lewis et al. ............... 709/222 |
| 6,012,088 A * | 1/2000 | Li et al. .................... 709/219 |
| 6,094,659 A * | 7/2000 | Bhatia ..................... 707/104.1 |
| 6,286,039 B1 * | 9/2001 | Van Horne et al. ........ 709/221 |
| 6,700,890 B1 * | 3/2004 | Langley et al. ........ 370/395.31 |
| 6,910,064 B1 * | 6/2005 | Astarabadi et al. ........ 709/203 |

* cited by examiner

Primary Examiner—John B. Walsh
(74) Attorney, Agent, or Firm—Cohen, Pontani, Lieberman & Pavane

(57) ABSTRACT

A method and apparatus for dynamically and automatically configuring an endpoint device to a computer network of a network system. When the endpoint device, such as a computer or router, initially connects to a computer network, it is dynamically assigned or allocated a first unique network (IP) address, as by a DHCP (Dynamic Host Configuration Protocol) server. The allocation of the first network address is monitored and, in response to the monitored allocation, a connection between a configuration manager and the endpoint device is established. The class of the endpoint device is then remotely identified and appropriate configuration information stored in a configuration database is retrieved and utilized to automatically configure the endpoint device within the network system.

26 Claims, 2 Drawing Sheets

METHOD AND APPARATUS FOR CONFIGURING AN ENDPOINT DEVICE TO A COMPUTER NETWORK

BACKGROUND OF THE INVENTION

1. Field of the Invention

The present invention is directed to computer networks. More specifically, the present invention is directed to a method and apparatus for dynamically and automatically configuring an endpoint device to a computer network.

2. Description of the Related Art

In a computer network system, a computer network generally interconnects a large number of computers with other types of endpoint devices such as routers and switches and the like. Within the computer network system, one or more server computers processes requests from and coordinates transfers of information to and among client computers. For example, a DHCP (Dynamic Host Configuration Protocol) server continuously tracks client computers which log onto and off the computer network so as to dynamically track changes in the computer network configuration of computers and other endpoint devices. To implement such tracking, the DHCP server assigns a unique IP (Internet Protocol) address for a fixed period of time or lease period to each endpoint device connected to the computer network. When the lease period expires, the IP address is reassigned to another client computer.

Although the DHCP server dynamically tracks the computer network configuration, each client computer or endpoint device must be manually configured onto the computer network. Such manual configuration of endpoint devices is a tedious, time-consuming task that typically requires the services of a certified network administrator. With large numbers of endpoint devices, the cumulative time and expense to manually configure these devices onto each computer network becomes substantial.

SUMMARY OF THE INVENTION

The present invention is directed to a method and apparatus for dynamically and automatically configuring an endpoint device to a computer network. Initially, the endpoint device (such as a computer or router) connects to a computer network in the computer network system and is dynamically assigned or allocated a first unique network address. The first unique network address may be for example a unique IP address assigned from a DHCP (Dynamic Host Configuration Protocol) server. The allocation of the first network address is monitored and, in response to the monitored allocation, a connection between a configuration manager and the endpoint device is established. The class of the endpoint device is then identified and configuration information from a configuration database is retrieved and used to automatically configure the endpoint device to the computer network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters delineate similar elements.

DETAILED DESCRIPTION OF THE PRESENTLY PREFERRED EMBODIMENTS

Figure 1:
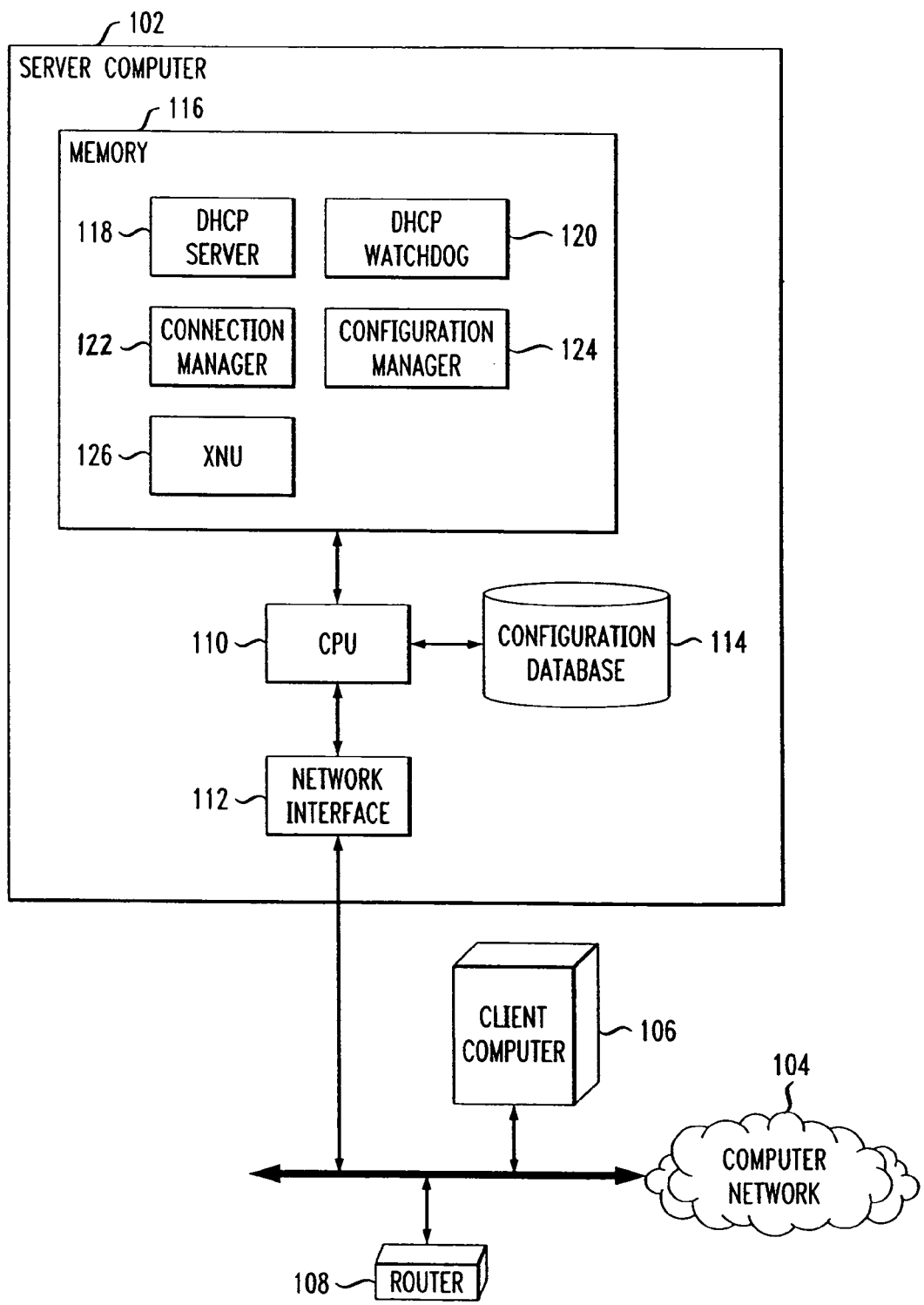
FIG. 1 is a block diagram of a computer network system.

FIG. 1 depicts a computer network system 100 comprising a server computer 102, a computer network 104, and a multiplicity of various client endpoint devices, as for example a client computer 106 and a router 108. The server computer 102 receives requests for information from client endpoint devices and coordinates communication of information to and between endpoint devices that are coupled to the network 104. In the present invention, the server computer 102 automatically and dynamically configures endpoint devices to be added to the computer network 104. In other words, the network server 102 dynamically tracks the status of each endpoint device that is connected to and disconnected from the network 104 and automatically configures such endpoint devices that are connected to or disconnected from the network.

Server computer 102 preferably comprises a central processing unit (CPU) 110, a network interface 112, a configuration database 114 and a memory 116. The CPU 110 executes instructions in software programs that are stored in the memory 116 so as to coordinate operation of the server computer. The network interface 112 allows the server computer 102 to communicate with endpoint devices connected to the network 104. One example of the network interface 112 is a network interface card or network adapter card, although other forms of network interface such as a modem are contemplated and known and may be employed. The network interface 112 typically has a unique MAC (Media Access Control) address.

The configuration database 114 stores configuration information required to permit the server computer 102 to configure endpoint devices that are coupled or connected to the network 104. One illustrative type of configuration database 114 is a LDAP (Lightweight Direct Access Protocol) database. The configuration information stored in the configuration database 114 is used to configure endpoint devices within the network system 100 and varies as among different classes or types of endpoint devices. As is well known to those skilled in the art, many forms of configuration information exist, including by way of example default logins for endpoint devices within the network 104, VoIP (Voice over IP) configuration, routing tables, and TFTP (Trivial File Transfer Protocol) server information for firmware download.

The memory 116 stores software and data structures required to operate the server computer 102. Memory 116 preferably stores software programs that contain instructions to implement a DHCP (Dynamic Host Configuration Protocol) server 118, a DHCP watchdog 120, a connection manager 122 and a configuration manager 124. Memory 116 also stores a XNU (Extensible Network Configuration Utility) software program 126 which coordinates the other software programs to implement the present invention.

The DHCP server 118 assigns an IP address for a fixed period or lease time to each endpoint device connected to the network 104. This IP address uniquely identifies the endpoint device in the network 104. In a preferred embodiment, the DHCP server 118 provides the unique IP address to an endpoint device in a passive manner, namely, i.e., in response to a request signal from that endpoint device. However, the DHCP server 118 may also provide the IP address in an active manner; for example, the DHCP server 118 may provide a polling signal and then transmit the IP address to the endpoint device in response to a reply from that endpoint device to the polling signal.

The DHCP watchdog 120 monitors activities of the DHCP server 118. For example, the DHCP watchdog 120 verifies each assignment of a unique IP address from the DHCP server 118 to an endpoint device. Verification of the assigned IP address is transmitted from the DHCP watchdog to a connection manager 122 to thereby link the operation of the DHCP server 118 and the configuration manager 124.

The connection manager 122 determines whether a connection or session between the endpoint device and the server computer 102 can be established. To perform this determination, the connection manager 122 tests specific, pre-selected protocols to determine whether the server computer 102 is capable of communicating and transferring information with the endpoint device. The different protocols may for example include SNMP (Simple Network Management Protocol), telnet and SSH (Secure Shell) and the like, but the connection manager 122 is also extensible so as to accommodate and utilize new protocols. Each identified protocol specifies the manner in which the server computer 102 is to perform device management or manage the endpoint device within the network system 100.

The configuration manager 124 performs various functions to automatically configure endpoint devices to the network 104. One function of the manager 124 is to identify the class or type of endpoint device that is connected to the server computer 102. Classes of endpoint devices may for example include a VoIP phone, computer workstation, switch and router and the like. For each type of identified endpoint device, the configuration manager 124 also coordinates the transfer of appropriate configuration information to and from the configuration database 114. The configuration manager 124 then uses this configuration information to automatically configure the endpoint device to the computer network 104.

In order to enhance management of endpoint devices in the network system 100, configuration manager 124 reassigns to the endpoint device an IP address that is within of a block or range of IP addresses associated with the type of identified endpoint device. This new or reassigned IP address replaces the IP address and corresponding lease term that had been previously assigned to the endpoint device by DHCP server 118. However, the MAC address associated with the network interface of the endpoint device is typically retained for use with the newly-assigned IP address to identify the endpoint device during network management. In addition, the configuration manager 124 may assign a new lease time that is either similar to the old lease term of the initially-assigned IP address or which is otherwise dependent upon the class or type of identified device.

The configuration manager 124 may also configure other networks so as to establish a predetermined configuration of a network of networks. In this case, the configuration manager 124 may configure a router or gateway (which is coupled to another network) to the network 104. For example, if the number of endpoint devices connected to the computer network 104 already exceeds a predetermined threshold, the configuration manager 124 may restrict any additional endpoint devices to be connected to the network as a router operatively coupled to another or different computer network. The configuration manager 124 may additionally or alternatively reconfigure any routers currently connected to the computer network 104 and thus provide the network 104 with the capability of connecting additional endpoint devices to the network 104, e.g., via subnetting. In this case, any endpoint devices connected to those other networks (and indirectly connected to the network 104) through currently connected routers will be disconnected or decoupled from the network 104 (by either disconnecting the endpoint devices connected to the other networks or replacing the other networks connected to the endpoint devices to be disconnected from the network 104) so as to enable other additional endpoint devices to be connected to the network 104.

The XNU (Extensible Network Configuration Utility) 126 is a software program that contains instructions through which the server computer 102 coordinates the DHCP server 118, DHCP watchdog 120, connection manager 122 and configuration manager 124 for automatically and dynamically configuring endpoint devices in the network 104 in accordance with the present invention. XNU 126 is extensible so as to accommodate the configuring of new types of endpoint devices to the network. XNU 126 is implemented so as to be independent of the platform of server computer 102 and is preferably written in a dynamic language such as XML (Extensible Markup Language). Although XNU 126 is depicted as an independent software program that is stored in the memory 204, it may also be implemented as a software tool within configuration manager 124. And in addition to enabling the server computer 102 to automatically and dynamically configure endpoint devices to the network 104, XNU 126 also supports automated and dynamic configuration by the server computer 102 of a network of networks; in this case, the endpoint devices are typically routers and/or gateways that connect to other networks.

Figure 2:
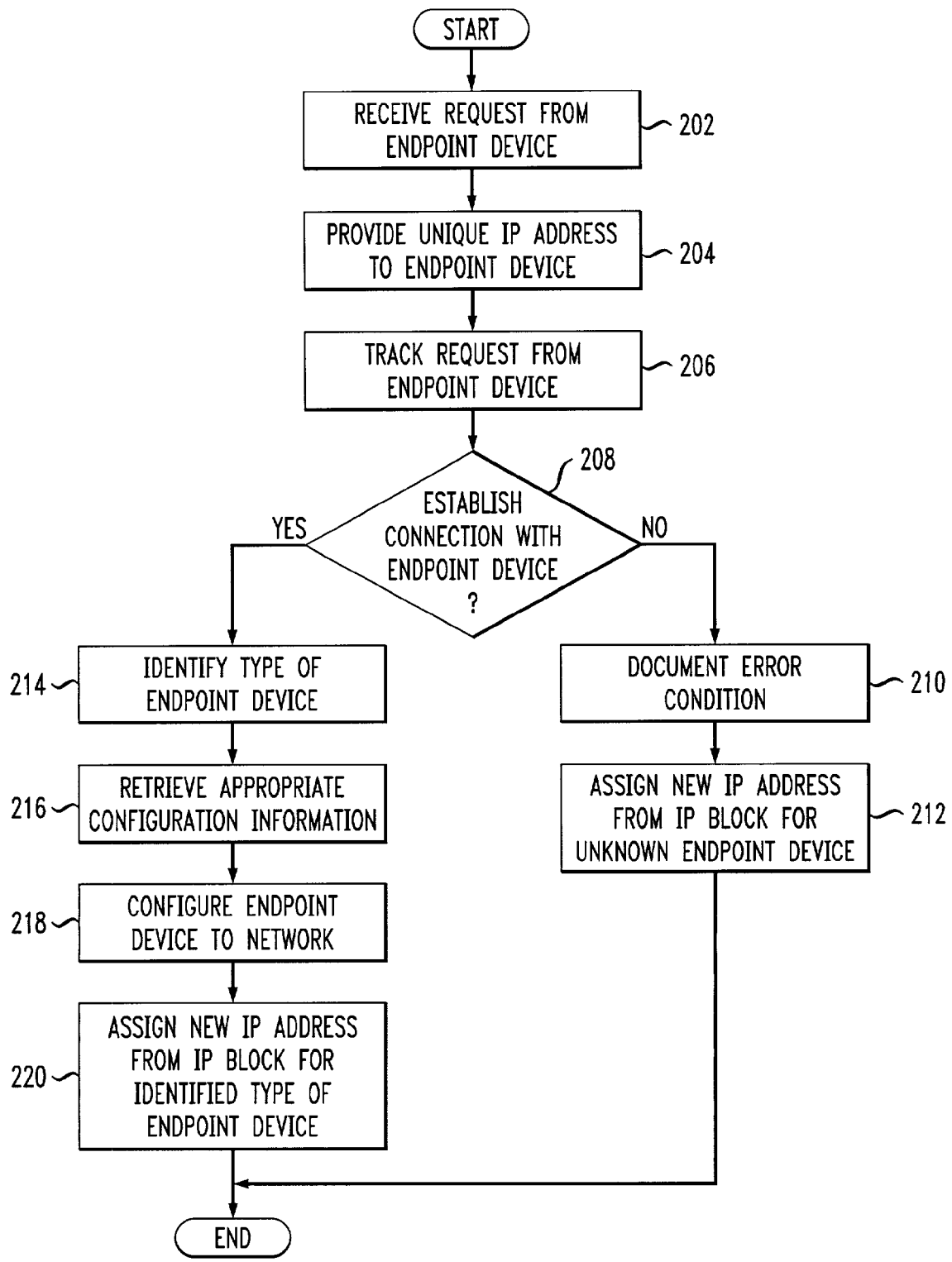
FIG. 2 is a flowchart of a method in accordance with the present invention.

The flowchart of FIG. 2 depicts a method for dynamically and automatically configuring an endpoint device to the network 104 in accordance with the present invention. The steps of this method describe the operations of the server computer 102 when the XNU (extendable network configuration utility) is executed. Although described with respect to one endpoint device, the method is likewise applicable to configure other endpoint devices that are connected to network 104.

Initially, the configuration manager initializes or sets up the DHCP server 118. An endpoint device then connects to the network 104 and broadcasts or otherwise transmits over the network a signal containing a request for a unique IP address. The DHCP server 118 receives the request from the endpoint device (step 202) and, in response, provides a unique IP address to that endpoint device (step 204). Alternatively, the DHCP server 118 transmits a polling signal and provides the assigned IP address to any endpoint device that responds with a reply signal. This unique IP address is provided to the endpoint device by DHCP server 118 for a predetermined period of time or lease period.

The DHCP watchdog 120 tracks or verifies the request from the endpoint device (step 206) and transmits a signal reporting the verification. On receipt of the verification signal from DHCP watchdog 120, connection manager 122 attempts to establish a connection between configuration manager 124 and the endpoint device (step 208). Connection manager 122 attempts the connection with the endpoint device using a predetermined order of session protocols. For example, connection manager 122 preferably first attempts an SNMP connection, then a telnet connection, and then an SSH connection, although it is also contemplated that the connection manager 122 may attempt other protocol types and/or testing orders.

If the connection manager 122 is unable to connect with the endpoint device using any of the attempted protocols, it documents the error condition or non-connection with XNU 126 (step 210). The connection manager then assigns to the endpoint device a new IP address selected from an IP block of addresses reserved for unknown endpoint devices (step 212). The DHCP server 118 is notified of this condition and change of IP addresses and removes the IP address previously assigned to the endpoint device from its listing of active addresses to permit its future use.

If, on the other hand, connection manager 122 successfully connects with the endpoint device using one of the test protocols, configuration manager 124 identifies the type of the endpoint device that is connected to the network 104 (step 214). The configuration manager then retrieves configuration information stored in configuration database 114 for the identified type of endpoint device (step 216) and uses the retrieved configuration information to automatically configure the endpoint device to network 104 (step 218). The configuration manager then assigns to the endpoint device a new unique IP address from a predetermined block or range of IP addresses for the identified type of endpoint device (step 220) and the IP address previously assigned by the DHCP server is removed from the listing of active addresses and reserved for future use. Optionally, the lease period associated with the previous IP address may be transferred or modified in accordance to the identified class of device.

The assignment of the new IP address from among blocks of IP addresses of similar devices allows the server computer 102 to readily identify and manage different types of endpoint devices within the network system 100. Various network management functions are advantageously affected by this IP address assignment scheme, including management of subnets, security and other services, and troubleshooting of network system 100.

With further reference to FIG. 1, the computer network 104 operates a transmission medium between various endpoint devices connected thereto. The computer network 104 may itself comprise a plurality of other interconnected computer networks. A preferred form of the computer network is the Internet or another implementation or form of IP-based network, although the present invention is likewise applicable to additional types of networks as well.

The client computer 106 and router 108 are exemplary endpoint or client devices connected to server computer 102. The present invention is also applicable to other types of endpoint devices connected to the computer network 104, such for example as switches printers and the like. Although the invention is specifically described herein with respect to the configuring of an endpoint device to a computer network 104, where the endpoint device is for example a router 108 coupled to another computer network the invention may likewise be applied to the automated configuration of interconnected computer networks.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring an endpoint device to a computer network, the endpoint device being in one of a plurality of classes of endpoint devices, said method comprising the steps of:

storing configuration information in a configuration database, the configuration information comprising one set of configuration information for each class of the plurality of classes of endpoint devices, such that each class associated with a different variety of endpoint device and each one set of configuration information is applicable to all endpoint devices in the each class;

monitoring a dynamic allocation of a first unique network address to the endpoint device when the endpoint device is connected to the computer network;

establishing, in response to said monitoring, a connection between a configuration manager and the endpoint device;

identifying, through said established connection, a class of the endpoint device connected to the network from said plurality of classes of endpoint devices;

retrieving the set of configuration information from the configuration database that is associated with the identified class of the endpoint device; and configuring the endpoint device to the computer network using the retrieved configuration information.

2. The method according to claim 1, further comprising the step of:

assigning to the endpoint device a second unique network address that is selected from a block of predetermined network addresses for the identified class of the endpoint device, to replace the first unique network address.

3. The method according to claim 2, wherein the first unique network address is a first IP address allocated by a DHCP (Dynamic Host Configuration Protocol) server and the second unique network address is a second IP address assigned by the configuration manager.

4. The method according to claim 1, further comprising the steps of:

receiving, by the computer network from the endpoint device, a request signal for assignment of a network address to the endpoint device; and providing the first unique network address to the endpoint device in response to said request signal.

5. The method according to claim 1, further comprising the steps of:

transmitting a polling signal to the endpoint device when the endpoint device is connected to the network;

receiving from the endpoint device a reply signal in response to the transmitted polling signal; and providing the first unique network address to the endpoint device in response to said reply signal.

6. The method according to claim 1, wherein the endpoint device comprises a router operatively connected to a second computer network for effecting a configuration of a plurality of computer networks.

7. The method according to claim 1, wherein the endpoint device comprises a computer-controlled standalone device.

8. The method according to claim 2, wherein said assigning further comprises removing the first unique address from a listing of active addresses so as to reserve the first unique address for future use.

9. The method according to claim 1, further comprising the steps of:
determining, prior to said establishing, whether communication between the computer network and the endpoint device can be established; and
if communication cannot be established, assigning to the endpoint device a second unique network address selected from a block of predetermined network addresses that are each reserved for an unknown device, to replace the first unique network address that had been allocated to the endpoint device.

10. The method according to claim 2, wherein the first unique network address is allocated to the endpoint device for a lease period, and further comprising the step of:
modifying, with said assigning of the second unique network address to replace the first unique network address, the lease period of the endpoint device connected to the computer network.

11. The method according to claim 1, further comprising the steps of:
determining whether adding of the endpoint device to the computer network exceeds a predetermined threshold number of endpoint devices to be connected to the network; and
if the predetermined threshold number is exceeded, restricting the endpoint device to be added as a router operatively connected to a different computer network.

12. A server computer for configuring an endpoint device for connection to a computer network, the endpoint device being in one of a plurality of classes of endpoint devices, said server computer comprising:
a network interface;
a configuration database for storing configuration information comprising one set of configuration information for each class of the plurality of classes of endpoint devices, wherein each class is associated with a different variety of endpoint device and each one set of configuration information is applicable to all endpoint devices in the each class;
means for verifying a first unique network address provided via said network interface to an endpoint device connected to the computer network and for providing a signal indicative of said verifying;
a connection manager operable for establishing, in response to the signal from said verifying means, communication between the computer network and the endpoint device; and
a configuration manager operable for identifying a class of the endpoint device connected to the computer network from said plurality of classes of endpoint devices, for retrieving from said configuration database configuration information for the identified class of the endpoint device,
and for automatically configuring the endpoint device to the computer network using the retrieved configuration information.

13. The server computer according to claim 12, further comprising:
a DHCP server for assigning to the endpoint device a unique IP address as the first unique address.

14. The server computer according to claim 12, wherein said configuration manager is operable to assign to the endpoint device a second unique network address selected from a network address within a block of predetermined addresses for the identified class of the endpoint device, wherein the second network address replaces the first network address.

15. The server computer according to claim 12, wherein said verifying means comprises a DHCP watchdog.

16. A computer readable medium having stored thereon a plurality of instructions which, when executed by a processor, cause the processor to perform the steps of:
storing configuration information in a configuration database, the configuration information comprising one set of configuration information for each class of the plurality of classes of endpoint devices, such that each class associated with a different variety of endpoint device and each one set of configuration information is applicable to all endpoint devices in the each class;
monitoring a dynamic allocation of a first unique network address to an endpoint device when the endpoint device is connected to a computer network, the endpoint device being in one of a plurality of classes of endpoint devices;
establishing, in response to said monitoring, a connection between a configuration manager and the endpoint device;
identifying, through said established connection, a class of the endpoint device connected to the network from said plurality of classes of endpoint devices;
retrieving configuration information from a configuration database for the identified class of the endpoint device; and
configuring the endpoint device to the computer network using the retrieved configuration information.

17. The computer readable medium according to claim 16, further comprising the step of:
assigning to the endpoint device a second unique network address that is selected from a block of predetermined network addresses for the identified class of the endpoint device, to replace the first unique network address.

18. The computer readable medium according to claim 17, wherein the first unique network address is a first IP address allocated by a DHCP (Dynamic Host Configuration Protocol) server and the second unique network address is a second IP address assigned by the configuration manager.

19. The computer readable medium according to claim 16, wherein the endpoint device comprises a router operatively connected to a second computer network for effecting a configuration of a plurality of computer networks.

20. The computer readable medium according to claim 16, wherein the endpoint device comprises a computer-controlled standalone device.

21. The method according to claim 1, wherein the plurality of classes include a VoIP phone class, a computer workstation class, a switch class, and a router class.

22. The server computer according to claim 12, wherein the plurality of classes include a VoIP phone class, a computer workstation class, a switch class, and a router class.

23. The computer readable medium according to claim 16, wherein the plurality of classes include a VoIP phone class, a computer workstation class, a switch class, and a router class.

24. The method according to claim 1, wherein each class of the plurality of classes of endpoints is a type of endpoint device.

25. The server computer according to claim 12, wherein each class of the plurality of classes of endpoints is a type of endpoint device.

26. The computer readable medium according to claim 16, wherein each class of the plurality of classes of endpoints is a type of endpoint device.

* * * * *